United States Patent Office 3,531,821
Patented Oct. 6, 1970

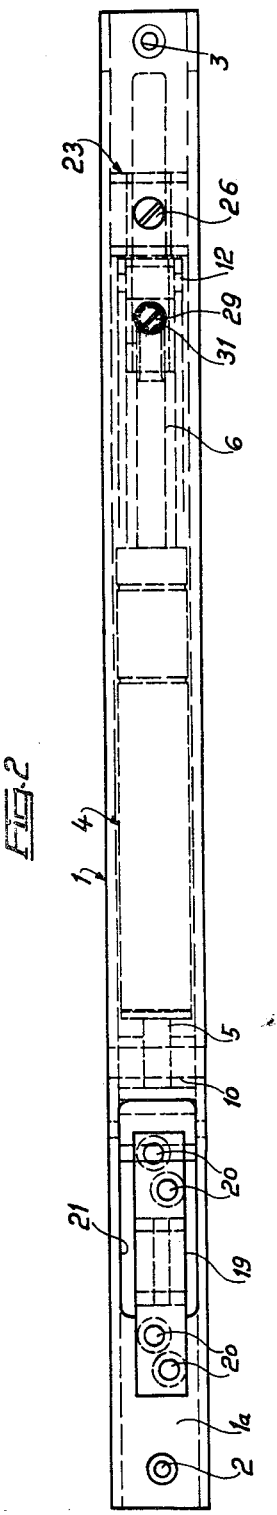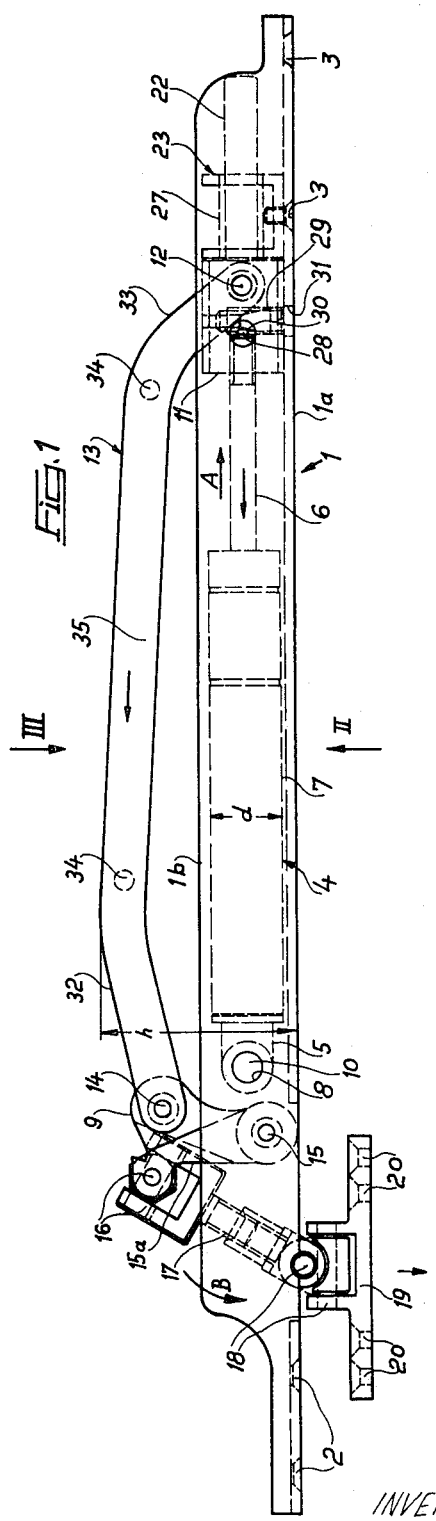

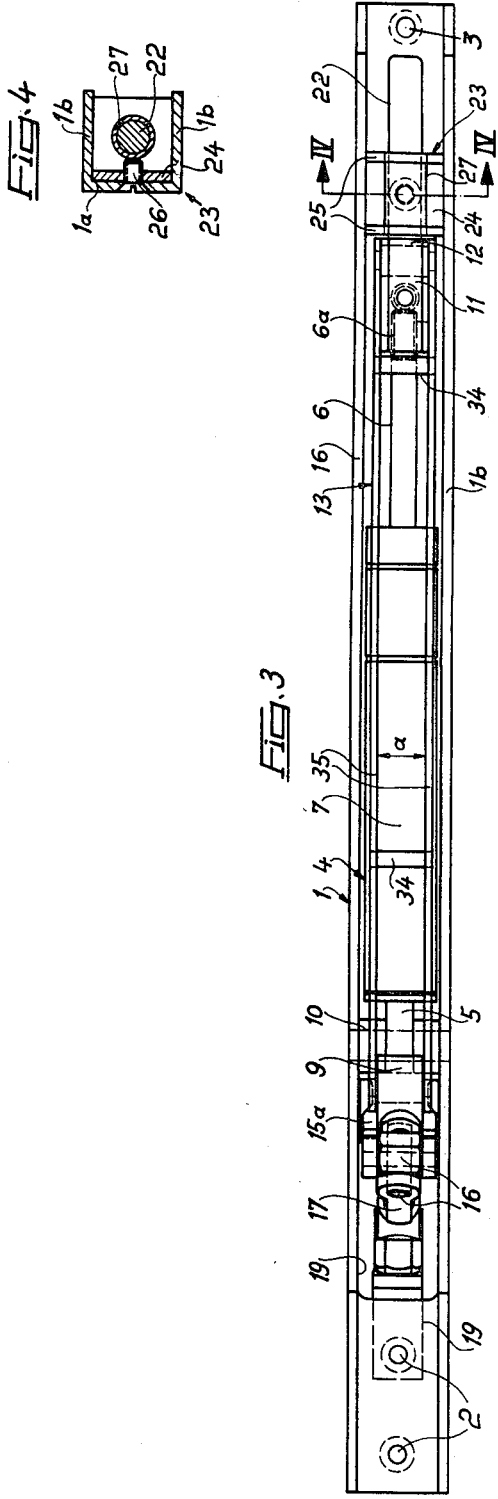

3,531,821
DOOR-CLOSING DEVICE
Georg Kaprolat and Hermann Burger, Gundelfingen (Danube), Germany, assignors to Josef Gartner & Co., Gundelfingen (Danube), Germany
Filed Oct. 11, 1968, Ser. No. 766,854
Claims priority, application Germany, July 16, 1968, 1,784,181
Int. Cl. E05f 3/20
U.S. Cl. 16—54      5 Claims

ABSTRACT OF THE DISCLOSURE

A door-closing device having a housing with a gas-pressure spring arranged in the housing, the cylinder head portion of the spring being connected in the vicinity of a rocking lever by a pin journalled to the housing and the piston rod of which is connected to a slide block, longitudinally slidable in the housing, and engaged by a pull link, which is connected to the rocking lever.

---

The invention relates to a door-closing device for fitting vertically in a door or door frame, and comprising a housing with a hydraulic dashpot and a pressure spring loaded brake piston, the piston rod of which is connected by a pull link to a rocking lever engaged by means of a universal joint by a pull member projecting through a housing aperture.

In a known door-closing device of this type, a complicated cast housing is provided, mounted on which is a dashpot open at the top, so that part of the housing forms the dashpot upper closure, through which the piston rod is passed, the latter being surrounded by a helical pressure spring. This known door-closing device is comparatively expensive in construction, regarding both expenditure on material and also manufacturing costs.

The problem underlying the present invention is to provide a door-closing device distinguished for its much simpler construction and low weight, and also for its comparatively low manufacturing cost.

In a door-closing device of the above-mentioned type, this problem is solved according to the invention in that a housing having a channel cross-section is provided, and a gas-pressure spring is arranged in the said housing, the cylinder head part of which spring is rigidly connected, in the vicinity of the rocking lever, to the housing by a pin journalled in the channel-section sides, and the piston rod of which is connected to a slide block, longitudinally slidable in the housing, and engaged by a pull link, which is connected to the rocking lever.

This new door-closing device has the substantial advantage that a commercial channel section, advantageously made of aluminium, may be used, and that only one inexpensive machining of this channel section is necessary for mounting and fitting the individual parts of the door-closing device. The simple construction of the new door-closing device is still further enhanced by the provision of a gas-pressure spring forming a self-contained component, which inter alia has the advantage that this gas-pressure spring requires no maintenance, is of low weight and in addition is of small dimensions, and in particular also has a comparatively small diameter.

The invention will be described more particularly in the following with reference to an embodiment example represented in the drawings, in which:

FIG. 1 shows a door-closing device for fitting vertically in a door or door frame, in side view, in the horizontal position;

FIG. 2 shows the front view of this door-closing device seen in the direction II in FIG. 1;

FIG. 3 shows a rear view of this door-closing device seen in the direction III of FIG. 1;

FIG. 4 shows a cross-section on the line IV—IV in FIG. 3.

In the drawings, a housing consisting of a channel section is shown at 1, the web of the channel section being denoted by 1a and the two sides thereof by 1b. Suitable holes 2 and 3 for fixing screws are provided for flush-mounting of the door-closing device shown. In this housing 1, that is to say, between its sides 1b, is mounted a cylindrical gas-pressure spring 4, of which the head part is denoted by 5 and the piston-rod by 6. In known manner, this gas-pressure spring is filled with a gas under pressure which acts on the piston of the piston rod 6, there being also provided in the cylinder 7, closed at both ends, of the gas-pressure spring a hydraulic dashpot device, which, during the return movement of the piston rod 6 in the direction A, exerts a braking action for retarding the closing movement.

As follows from the drawings, the gas-pressure spring 4, comprising substantially the parts 5 to 7, forms a self-contained component, so that it may be mounted in a simple manner in the housing. For this purpose the gas-pressure spring head part 5, which is provided with a bore 8, is connected in the vicinity of a rocking lever 9 rigidly to the pin 10 journalled in the channel-section sides 1b. At the other, lower end, the piston rod 6 of the gas-pressure spring is connected to a slide block 11, longitudinally slidable in the housing 1 and engaged at 12 by a pull link 13, pivoted by the upper other end at 14 to the rocking lever 9. This rocking lever is pivotally mounted on the pin 15 secured in the sides 1b, and has an arm 15a, which in turn is connected by a universal joint 16, and a pull member 17 at 18, also by a universal joint to a plate 19 having fixing holes 20 for screws for fixing to the door or door frame. A suitable rectangular aperture 21 is provided in the web 1a of the housing for the passage of the pull member 17 or the universal joint 16.

The above-mentioned slide block 11, in which the end of the piston rod is screwed at 6a, has a guide rod 22 in the direction of the piston rod 6. Between the channel section sides 1b is a stationary bearing bracket 23 in which this guide rod 22 is mounted for longitudinal sliding. Advantageously, this bearing bracket consists of a channel section piece with the web 24 and the two sides 25. This channel section piece is secured to the web 1a of the housing, by means of a screw 26 or the like. In the sides 25 of the channel section piece is inserted a cylindrical bush 27, in which the guide rod 22 slides.

In the hollow piston rod 6 a regulating pin 28 (FIG. 1) for regulating the oil damping, is longitudinally slidable, its end projecting somewhat beyond the piston-rod end. A regulating screw 29 is arranged in the slide block 11 at right-angles to the said regulating pin, which screw has at 30 an inclined surface acting on the regulating pin 28. By screwing in this regulating screw, the regulating pin is forced into the piston rod 6 while, on screwing back the regulating screw, the regulating pin is forced out in the direction A. A suitable hole 31 is provided in the web 1a of the housing to permit actuating of this regulating screw.

In the advantageous embodiment example shown, the pull link 13 consists of two flat sections 35 bent at both ends 32, 33, arranged at a relatively wide distance a apart, connected together by cross-pieces 34 and embracing on both sides the rocking lever 9 and the slide block 11. This configuration of the pull link 13 not only has the advantage of simple construction and simple connection of the rocking lever and slide block, but also the advantage that a relatively low overall height h of the door-closing device is obtained, and on the opening of the door, that is to say, on rocking the lever 9 in the direction of the arrow B, the pull link, consisting of the flat sections 35, can plunge unimpeded between the sides 1b of the housing, without obstruction by the gas-spring cylinder 7. Despite relatively high spring power, the gas-spring cylinder 7 is of relatively small diameter $d$, so that for this reason also the dimensions of the housing 1 are relatively small in cross-section.

We claim:

1. A door-closing device for vertical fitting in a door or door frame comprising a housing having a channel cross-section, a gas-pressure spring arranged in the housing and having a cylinder head part and a piston rod, a pin journalled in said housing and rigidly connecting said cylinder head part to the housing, a hydraulic dash pot acting upon said piston rod, a slide block longitudinally slidable in the housing and connected to the piston rod, a rocking lever mounted in the housing, a pull link coupling said slide block and said rocking lever, a pull member projecting through an aperture in the housing, and a universal joint coupling the pull member to the pull link.

2. A device as claimed in claim 1 including a guide rod attached to said slide block and a stationary bearing bracket mounted between the sides of the channel-section housing, the guide rod being longitudinally slidable in the bracket.

3. A device as claimed in claim 2 in which the said bracket comprises a channel-section piece having its web secured to the web of the housing and a cylindrical bush disposed between the sides of said channel-section piece, said guide rod sliding in said bush.

4. A device as claimed in claim 1 wherein said piston rod is hollow, comprising a regulating pin arranged within said hollow piston rod and projecting beyond the end thereof, and a regulating screw mounted in said slide block at right angles to said regulating pin, said screw having an inclined surface acting on said pin.

5. A device as claimed in claim 1 wherein said pull link comprises two flat sections bent at both ends and crosspieces connecting together said flat sections, the flat sections being arranged to embrace the rocking lever and the slide block.

References Cited

UNITED STATES PATENTS

| | | | |
|---|---|---|---|
| 1,176,802 | 3/1916 | Williams | 16—54 |
| 3,449,788 | 6/1969 | Wake | 16—54 |

DONALD A. GRIFFIN, Primary Examiner